3,299,091
5-HYDRAZINO-PYRAZOL DERIVATIVES

Ernst Jucker, Ettingen, and Adolf J. Lindenmann and Arnold Vogel, Basel, Switzerland, assignors to Sandoz Ltd. (also known as Sandoz A.G.), Basel, Switzerland
No Drawing. Filed Dec. 4, 1964, Ser. No. 416,130
Claims priority, application Switzerland, Dec. 13, 1963, 15,297/63; July 30, 1964, 10,017/64
6 Claims. (Cl. 260—310)

The present invention relates to new heterocyclic compounds and a process for their production.

The present invention provides 5-hydrazino-pyrazole derivatives of Formula I,

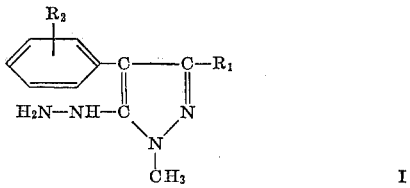

in which $R_1$ signifies a lower alkyl radical and $R_2$ signifies a hydrogen atom or a halogen atom, and their acid addition salts. As used herein the term "lower alkyl" radicals indicates those of from 1 to 8 carbon atoms inclusive.

The present invention further provides a process for the production of Compounds I, characterized in that a 5-amino-pyrazole derivative of Formula II,

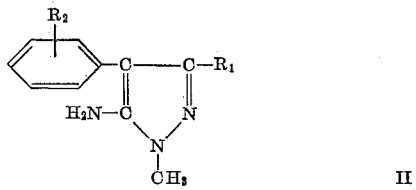

in which $R_1$ and $R_2$ have the above significance, is diazotized, the resulting diazonium compound is reduced with a reducing agent for converting a diazonium compound to the corresponding hydrazine compound and the resulting Compound I is optionally reacted with an organic or inorganic acid to give an acid addition salt.

One method of effecting the process of the present invention is as follows: A mineral acid (preferably hydrochloric acid) solution of a 5-amino-pyrazole Derivative II, e.g. 1,3-dimethyl-4-phenyl-5-amino-pyrazole, is diazotized in the cold with an aqueous sodium nitrite solution. The resulting diazonium salt solution is subsequently treated with a reducing agent (e.g. tin-(II)-chloride, sulphur dioxide or an alkali metal salt of sulphurous acid) for the conversion of a diazonium compound to the corresponding hydrazine compound. When tin-(II)-chloride dihydrate (the preferred reducing agent) is used a solution of tin-(II)-chloride dihydrate in concentrated hydrochloric acid is added dropwise, at a temperature of 0–5° C., to the diazonium salt solution and the reaction mixture is subsequently stirred for 2 to 25 hours at room temperature to complete reduction. The mixture is then evaporated, an alkali metal hydroxide solution, e.g. 20% aqueous sodium hydroxide solution, is added to the residue and the resulting 5-hydrazino-pyrazole derivative is extracted with an inert organic solvent, preferably chloroform, methylene chloride, benzene or toluene. The Compound I may be isolated from the organic solution in known manner and optionally converted into an acid addition salt in manner known per se.

The compounds I have hitherto not been described in the literature on the subject. They are basic compounds; with organic or inorganic acids they form relatively stable salts which are crystalline at room temperature. Examples of acids for acid addition salt formation are: hydrochloric, hydrobromic, sulphuric, fumaric, maleic, malic, acetic and tartaric acid.

The compounds of the invention, and their salts, have valuable pharmacodynamic properties and are thus suggested for use in therapy. They show a reserpine antagonistic and sympathicomimetic effect and have blood pressure lowering properties. These properties are especially marked in the case of 1,3-dimethyl-4-phenyl-5-hydrazino-pyrazole. Their toxicity is relatively low in comparison with their effectiveness. The 5-hydrazino-pyrazole derivatives of the invention and their salts are therefore indicated for use as medicaments, particularly in the treatment of various psychic illnesses, inter alia psychic depression conditions, and as psychic stimulants. They are also indicated for the treatment of hypertonia.

The compounds of the invention are indicated as pharmaceuticals on their own or in the form of appropriate medicinal preparations for administration, e.g. parenterally or enterally. In order to produce such medicinal preparations the compounds are worked up with inorganic or organic adjuvants which are inert and physiologically acceptable. Examples of such adjuvants are as follows:

Tablets and dragées: lactose, starch, talc and stearic acid; injectable solutions: water, alcohols, glycerin and vegetable oils.

The preparations may furthermore contain one or more suitable preserving, stabilizing or wetting agents, solubilizers, sweetening and colouring substances or flavourings.

The present invention thus further provides pharmaceutical compositions containing, in addition to a physiologically acceptable carrier, a Compound I and/or an acid addition salt thereof.

The starting materials II are new and form part of the present invention. They may be produced by methods known per se, e.g. by condensation of a 3-ketonitrile of Formula III,

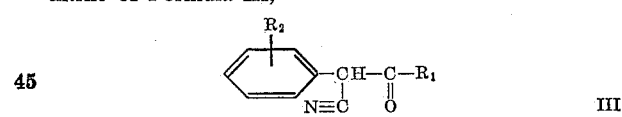

in which $R_1$ and $R_2$ have the above significance, with methyl hydrazine in an inert solvent therefor, e.g. glacial acetic acid, at room temperature or slightly above.

In the following non-limitative examples all temperatures are indicated in degrees centigrade and are uncorrected.

*Example 1.—1,3-dimethyl-4-phenyl-5-hydrazino-pyrazole*

A solution of 9.1 g. of sodium nitrite in 15 cc. of water is added dropwise at 0–5° to a solution of 8.1 g. of 1,3-dimethyl-4-phenyl-5-aminopyrazole in 65 cc. of 6 N hydrochloric acid. After stirring the resulting diazo solution for 30 minutes at 0–5° a solution of 39.0 g. of tin-(II)-chloride dihydrate in 155 cc. of concentrated hydrochloric acid is added dropwise at the same temperature. After stirring for 17 hours at room temperature, the reaction mixture is evaporated almost to dryness at 15 mm. Hg, the residue is taken up in cold 20% sodium hydroxide solution and extracted with chloroform. The chloroform solution is dried with magnesium sulphate, evaporated at 15 mm. Hg, the resulting crude product is dissolved in ethanol and 1 equivalent of an approximately 4 N ethanolic hydrochloric acid solution (10% excess) is added thereto, whereupon the monohydrochloride crystallizes. After recrystallizing from methanol/ether the monohydrochloride melts at 161° (decomposition).

The 1,3-dimethyl-4-phenyl-5-amino-pyrazole used as starting material is produced as follows: 10.35 g. of 2-phenyl-acetoacetic acid nitrile are dissolved in 100 cc. of glacial acetic acid by slight heating. A solution of 3.0 g. of methyl hydrazine in 20 cc. of glacial acetic acid is rapidly added dropwise to the solution at a temperature of 25° and the resulting clear solution is left to stand for 18 hours at room temperature. After evaporating the solution at 15 mm. Hg, the oily residue is dissolved in chloroform and the solution is shaken out with cold 20% sodium hydroxide solution. After drying over magnesium sulphate the organic phase is evaporated at 15 mm. Hg and the resulting crystalline product recrystallized from benzene. Melting point 145°.

*Example 2.—1,3-dimethyl-4-(o-chlorophenyl)-5-hydrazino-pyrazole*

A solution of 11.1 g. of 1,3-dimethyl-4-(o-chlorophenyl)-5-amino-pyrazole in 150 cc. of 2 N hydrochloric acid is diazotized at 0–5° by the dropwise addition of a solution of 3.8 g. of sodium nitrite in 10 cc. of water. After stirring for 30 minutes at 0–5°, a solution of 33.85 g. of tin-(II)-chloride dihydrate in 150 cc. of concentrated hydrochloric acid is added dropwise at the same temperature and the mixture is stirred for a further 6 hours at room temperature. The reaction mixture is subsequently evaporated at 15 mm. Hg and the residue is taken up in 400 cc. of cold 20% sodium hydroxide solution and extracted with chloroform. The chloroform solution is dried with magnesium sulphate and evaporated at 15 mm. Hg. 1 equivalent of an approximately 6 N ethanolic hydrochloric acid solution is added to the solution of the crude base in a small amount of chloroform whilst cooling, whereupon the hydrochloride crystallizes. It is recrystallized from methanol/ethanol. Melting point 184° (decomposition).

The 1,3-dimethyl-4-(o-chlorophenyl)-5-aminopyrazole used as starting material is produced from 2-(o-chlorophenyl)-acetoacetic acid nitrile and methyl hydrazine in a manner analogous to that described in Example 1. Melting point 129–130° from methylene chloride/ether/petroleum ether.

*Example 3.—1-methyl-3-n-propyl-4-phenyl-5-hydrazino-pyrazole*

10.75 g. of 1-methyl-3-n-propyl-4-phenyl-5-amino-pyrazole are suspended in 150 cc. of 2 N hydrochloric acid and diazotized at 5° by the dropwise addition of a solution of 3.8 g. of sodium nitrite in 10 cc. of water. The yellow solution is stirred for a further 30 minutes at 5° and a solution of 34 g. of tin-(II)-chloride dihydrate in 150 cc. of concentrated hydrochloric acid is added dropwise whilst stirring at the same temperature. After stirring for 15 hours at room temperature the mixture is evaporated at 15 mm. Hg, the residue taken up in cold 20% sodium hydroxide solution, extracted a number of times with chloroform, the chloroform extracts are combined, dried with magnesium sulphate and evaporated at 15 mm. Hg. The crude base is dissolved in a small amount of ethanol and 1 equivalent of an approximately 6 N ethanolic hydrogen chloride solution is added to the solution, whereupon the hydrochloride crystallizes. It is recrystallized from ethanol. Melting point 155–156°.

The 1-methyl-3-n-propyl-4-phenyl-5-amino-pyrazole used as starting material is produced from 2 butyryl-phenylacetonitrile and methyl hydrazine in a manner analogous to that described in Example 1. Melting point 142–143° from methylene chloride/ether.

*Example 4.—1-methyl-3-n-butyl-4-(p-fluorophenyl)-5-hydrazino-pyrazole*

12 cc. of concentrated hydrochloric acid are added to a solution of 11.64 g. of 1-methyl-3-n-butyl-4-(p-fluorophenyl)-5-amino-pyrazole in 140 cc. of glacial acetic acid at 10° and the mixture is diazotized at 8–10° by the dropwise addition of a solution of 3.6 g. of sodium nitrite in 10 cc. of water whilst stirring. After stirring for 45 minutes at 5–10°, a solution of 32 g. of tin-(II)-chloride dihydrate in 140 cc. of concentrated hydrochloric acid is added dropwise at 0–5° and the mixture is then stirred for a further 5½ hours at room temperature. The mixture is then evaporated at 15 mm. Hg, the residue taken up in 500 cc. of ice cold 20% sodium hydroxide solution and extracted a number of times with chloroform. The combined chloroform extracts are dried with magnesium sulphate and evaporated at 15 mm. Hg. An approximately 6 N ethanolic hydrogen chloride solution containing one equivalent of hydrochloric acid is added to the solution of the crude base in a small amount of ethanol and evaporated at 15 mm. Hg. The resulting hydrochloride is crystallized from methanol/ether. Melting point 129–130° (decomposition).

The 1-methyl-3-n-butyl-4-(p-fluorophenyl)-5-amino-pyrazole used as starting material is produced from 2-valeroyl-p-fluorophenylacetonitrile and methylhydrazine in a manner analogous to that described in Example 1. Melting point 122–124° from ether.

*Example 5.—1-methyl-3-n-hexyl-4-(p-chlorophenyl)-5-hydrazino-pyrazole.*

10 g. of 1 - methyl-3-n-hexyl-4-(p-chlorophenyl)-5-amino-pyrazole are dissolved in 100 cc. of glacial acetic acid, 8.6 cc. of concentrated hydrochloric acid are added to the solution at 10° and diazotization is then effected at 5° by the dropwise/addition of a solution of 2.62 g. of sodium nitrite in 9 cc. of water. After stirring for 30 minutes at 5° a solution of 23.3 g. of tin-(II)-chloride dihydrate in 100 cc. of concentrated hydrochloric acid is added dropwise at the same temperature and the mixture is subsequently stirred for a further 5 hours at room temperature. The reaction mixture is then evaporated at 15 mm. Hg, the residue is taken up in 300 cc. of cold 20% sodium hydroxide solution and extraction is effected a number of times with chloroform. The combined chloroform extracts are dried with magnesium sulphate and evaporated at 15 mm. Hg. One equivalent of an approximately 6 N ethanolic hydrochloric acid solution is added to the solution of the crude base in a small amount of ethanol and evaporated at 15 mm. Hg. The resulting hydrochloride is crystallized from methanol/ether. Melting point 103° (decomposition).

The 1 - methyl-3-n-hexyl-4-(p-chlorophenyl)-5-amino-pyrazole used as starting material is produced from 2-heptanoyl-p-chlorophenylacetonitrile and methyl-hydrazine in a manner analogous to that described in Example 1. Melting point 93–94° from ether/petroleum ether.

What is claimed is:

1. A compound selected from the group consisting of compounds of the formula:

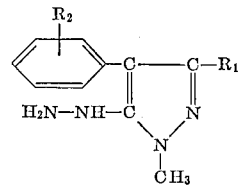

wherein $R_1$ is alkyl of 1 to 8 carbon atoms and $R_2$ is a member selected from the group consisting of hydrogen and halogen, and their pharmaceutically acceptable acid addition salts.

2. 1,3-dimethyl-4-phenyl-5-hydrazino-pyrazole.

3. 1,3-dimethyl-4-(o-chlorophenyl) - 5 - hydrazino-pyrazole.

4. 1-methyl-3-n-propyl-4-phenyl-5-hydrazino-pyrazole.

5. 1-methyl-3-n-butyl-4-(p-fluorophenyl)-5-hydrazino-pyrazole.

6. 1-methyl-3-n-hexyl-4-(p-chlorophenyl)-5-hydrazino-pyrazole.

References Cited by the Examiner

UNITED STATES PATENTS

| | | | |
|---|---|---|---|
| 2,721,143 | 10/1955 | Kraft et al. | 260—310 |
| 2,725,384 | 11/1955 | Burness | 260—310 |
| 2,989,539 | 6/1961 | Anderson et al. | 260—310 |
| 2,998,425 | 8/1961 | Dickinson | 260—310 |
| 3,004,983 | 10/1961 | Loev | 260—310 |
| 3,024,166 | 3/1962 | Kuna et al. | 167—65 |
| 3,036,955 | 5/1962 | Kuna et al. | 167—65 |
| 3,211,743 | 10/1965 | Schmidt et al. | 260—310 |

OTHER REFERENCES

Alberti Gaz. Chim Italiana, vol. 89, pages 1017–32 (1959).

Anderson et al., Jour. Med. Chem., vol. 7, pages 259–61 relied on (May 1964).

Elderfield Heterocyclic Compounds, vol. 5, page 91, New York, Wiley, 1957.

WALTER A. MODANCE, *Primary Examiner.*

N. TROUSOF, *Assistant Examiner.*